United States Patent
Afanasiev

(10) Patent No.: US 9,133,732 B2
(45) Date of Patent: Sep. 15, 2015

(54) ANTI-ROTATION PIN RETENTION SYSTEM

(75) Inventor: Gennadiy Afanasiev, Windermere, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 1047 days.

(21) Appl. No.: 13/112,156

(22) Filed: May 20, 2011

(65) Prior Publication Data

US 2011/0293412 A1 Dec. 1, 2011

Related U.S. Application Data

(60) Provisional application No. 61/348,894, filed on May 27, 2010.

(51) Int. Cl.
| | | |
|---|---|---|
| *F03B 11/02* | (2006.01) | |
| *F01D 25/24* | (2006.01) | |
| *F01D 9/04* | (2006.01) | |
| *F16B 21/02* | (2006.01) | |

(52) U.S. Cl.
CPC ............ *F01D 25/246* (2013.01); *F01D 9/042* (2013.01); *F16B 21/02* (2013.01); *F05B 2260/301* (2013.01); *F05D 2250/30* (2013.01); *F05D 2260/30* (2013.01)

(58) Field of Classification Search
CPC ... F01D 9/042; F01D 25/246; F05D 2260/30; F05D 2260/31; F05B 2260/30; F05B 2260/301; F16B 21/02
USPC .......... 415/208.1, 209.2, 209.3, 209.4, 173.6, 415/173, 7, 213.1, 214.1; 416/220 R, 221, 416/215
See application file for complete search history.

(56) References Cited

U.S. PATENT DOCUMENTS

| | | | |
|---|---|---|---|
| 3,644,057 A | 2/1972 | Steinbarger | |
| 3,811,784 A | 5/1974 | Nilsson | |
| 4,092,074 A | 5/1978 | Harper et al. | |
| 5,618,161 A | 4/1997 | Papageorgiou et al. | |
| 6,095,750 A | 8/2000 | Ross et al. | |
| 6,152,690 A * | 11/2000 | Tomita et al. | 415/173.7 |
| 6,908,279 B2 | 6/2005 | Sullivan et al. | |
| 6,971,847 B2 * | 12/2005 | Tiemann | 415/209.2 |
| 7,507,069 B2 * | 3/2009 | Kizuka et al. | 415/199.5 |

(Continued)

FOREIGN PATENT DOCUMENTS

| | | |
|---|---|---|
| EP | 0298892 A1 | 1/1989 |
| EP | 0731254 A1 | 9/1996 |
| WO | 2010023205 A1 | 3/2010 |

*Primary Examiner* — Dwayne J White
*Assistant Examiner* — Alexander White

(57) ABSTRACT

A turbine engine vane assembly assembled using an anti-rotation pin method can include a vane assembly having a vane supported on a shroud ring and a cavity seal coupled to the vane assembly by a securement mechanism. The cavity seal defines a securement receiving portion through which the securement mechanism is inserted. The securement receiving portion also includes a deformation receiver. The securement mechanism has a deformable rim at a first end and a key at a second end. The securement mechanism is rotatable between a first configuration and a second configuration where the key matingly engages the shroud ring and the cavity seal to reduce axial movement of the vane assembly. The deformable rim can be deformed into the deformation receiver to prevent rotation of the securement mechanism and disengagement of the securement mechanism from the vane assembly and cavity seal.

17 Claims, 5 Drawing Sheets

(56) References Cited

U.S. PATENT DOCUMENTS

| | | |
|---|---|---|
| 2008/0199312 A1 | 8/2008 | Chekanov et al. |
| 2009/0110552 A1 | 4/2009 | Anderson et al. |
| 2009/0196683 A1 | 8/2009 | Lunn et al. |
| 2009/0232651 A1 | 9/2009 | Ballard, Jr. et al. |
| 2010/0031906 A1 | 2/2010 | Cuatt et al. |
| 2010/0183435 A1 | 7/2010 | Campbell et al. |

* cited by examiner

ANTI-ROTATION PIN RETENTION SYSTEM

CROSS-REFERENCE TO RELATED APPLICATIONS

This application claims the benefit of U.S. Provisional Application No. 61/348,894, filed on May 27, 2010, which is incorporated herein by reference in its entirety.

FIELD OF THE INVENTION

Aspects of the invention relate in general to turbine engines and, more particularly, to the attachment of structures to a stationary turbine component.

BACKGROUND OF THE INVENTION

A conventional turbine engine has a compressor section, a combustor section and a turbine section. In operation, the compressor section can induct ambient air and compress it. The compressed air can enter the combustor section and can be distributed to each of the combustors therein. When the compressor discharge air enters the combustor, it is mixed with fuel supplied by a pilot nozzle and a plurality of main nozzles surrounding the pilot nozzle. Combustion of the air-fuel mixture occurs downstream of the nozzles in a combustion zone, which is largely enclosed within a combustor liner assembly. As a result, a hot working gas is formed. The hot working gas can be routed to the turbine section, where the gas can expand and generate power that can drive a rotor.

During engine operation, cylindrical components and rotatory components are rotated to move air and fuel through the engine. Such rotation causes vibrations inside the turbine engine. The vibrations can cause components of the engine to vibrate out of place or out of alignment. Additionally, the fluid movement within the engine also causes temperature changes within the engine. Such temperature changes can change the material properties of the engine components, thereby increasing the likelihood that those components can become misaligned or disengaged from their couplings or attachment points.

Conventional turbine engines can include rotary vanes and stationary vanes. Typically, a stationary vane assembly includes individual vanes assembled between an inner shroud ring and an outer shroud ring. Combustion gas passes through the annular path between the shroud rings and over the vanes. The vane assembly can include coolant outlets to allow coolant to flow radially inward through the vanes to coolant outlets. The coolant outlets can be open to a cavity formed between a rim-cavity seal and the outer shroud ring of the vane assembly. For example, in one implementation, the rim-cavity seal can be a U-ring, and a plenum can be formed between the U-ring and the outer shroud ring. The plenum can provide a cavity for return or exhaust of the coolant.

The rim-cavity seal and the stationary vane assembly are typically secured together by two pins. One pin is inserted between the outer shroud ring and the rim-cavity seal to prevent rotation of the vane assembly, and a second pin is inserted to maintain the first pin in place and to prevent the first pin from being extracted during engine operation. While the two-pin assembly restrains the motion of the vane assembly and prevents the extraction of the pin during engine operation, the two-pin assembly requires an extra component, thereby resulting in a cumbersome, expensive, and time-intensive assembly and disassembly process when the stationary vane assembly needs to be serviced.

In another conventional assembly, an anti-rotation pin is inserted between the outer shroud and the rim-cavity seal, and the head of the anti-rotation pin is deformed. In such an assembly, metal is staked around the pin. However, while the deformed anti-rotation pin prevents rotation of the vane assembly, the vibration and thermal environment of the engine during operation causes the anti-rotation pin to become disengaged.

Accordingly, there is a need for a vane assembly that can minimize the above-described concerns. To address the above described shortcomings, the present disclosure provides an enhanced self-locking anti-rotation pin for a turbine engine vane assembly that is cost-effective and less cumbersome to assemble and disassemble as compared to conventional vane assemblies.

SUMMARY OF THE INVENTION

A turbine engine vane assembly in accordance with the present disclosure and aspects of the invention comprises a vane supported by a shroud ring and secured to a cavity seal by a securement mechanism, such as a self-locking anti-rotation pin. The shroud ring can comprise an outer surface and an inner surface that form the support structure for the cavity seal. The shroud ring can define an aperture extending from the outer surface to the inner surface to receive the securement mechanism. Also, a protrusion can be formed on the outer surface of the shroud ring for interlocking engagement with the cavity seal. The cavity seal can be assembled to the shroud ring to provide the cavity for return coolant and exhaust during operation of the turbine engine.

The cavity seal can have a cavity outer surface and a cavity inner surface that form the walls which define the cavity for return coolant and exhaust. A protrusion receiving portion can be formed on the cavity outer surface. The protrusion receiving portion corresponds to the protrusion of is the shroud ring and is adapted for interlocking engagement with the protrusion. The cavity seal can define a securement receiving portion extending from the cavity outer surface to the cavity inner surface. The securement receiving portion can be a through hole for receiving the securement mechanism. The securement receiving portion can also include a deformation receiver positioned on a diameter for the securement receiving potion and extending diametrically away from a circumference of the securement receiving portion. In other words, the deformation receiver can be formed as a slot extending away from a circumference of the securement receiving portion.

The securement mechanism can be a pin having a deformable rim at the first end and a key at the second end. The securement mechanism can be inserted through the aperture of the shroud ring and the securement receiving portion of the cavity seal to secure the vane to the cavity seal. When the securement mechanism is inserted through the aperture and the securement receiving portion, the key protrudes therethrough at the inner surface of the shroud ring and the cavity inner surface. The securement mechanism can be rotatable between a first configuration and a second configuration. In the second configuration, the key can matingly engage the inner surface of the shroud ring such that an outer surface of the key abuts the inner surface of the key. When the securement mechanism is in the second configuration, a pressure can be exerted against the first end of the securement mechanism to deform the deformable rim. When the deformable rim is deformed, a portion of the deformable rim can be received in the deformation receiver of the cavity seal, thereby preventing rotation of the securement mechanism within the aperture and the securement receiving portion and preventing the securement mechanism from disengaging and coming out of the aperture and the securement receiving portion.

DETAILED DESCRIPTION OF EMBODIMENTS OF THE INVENTION

Embodiments of the invention are directed to a combustor liner for a turbine engine. Aspects of the invention will be explained in connection with various possible configurations for a turbine engine vane assembly assembled by an anti-rotation pin method, but the detailed description is intended only as exemplary. Indeed, it will be appreciated that aspects of the invention can be applied to other regions of the turbine engine. Embodiments of the invention are shown in the present figures, but the present invention is not limited to the illustrated structure or application.

Figure 1:
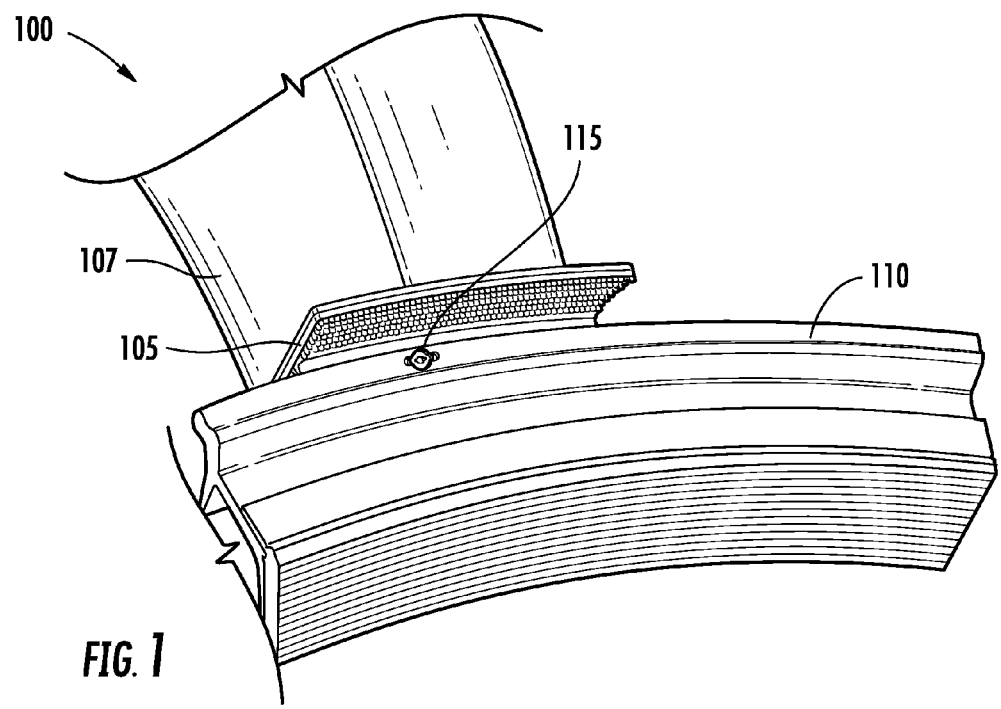
FIG. 1 is partial view of a side of an assembled turbine engine vane assembly in accordance with an exemplary embodiment of the present technology.
Figure 2:
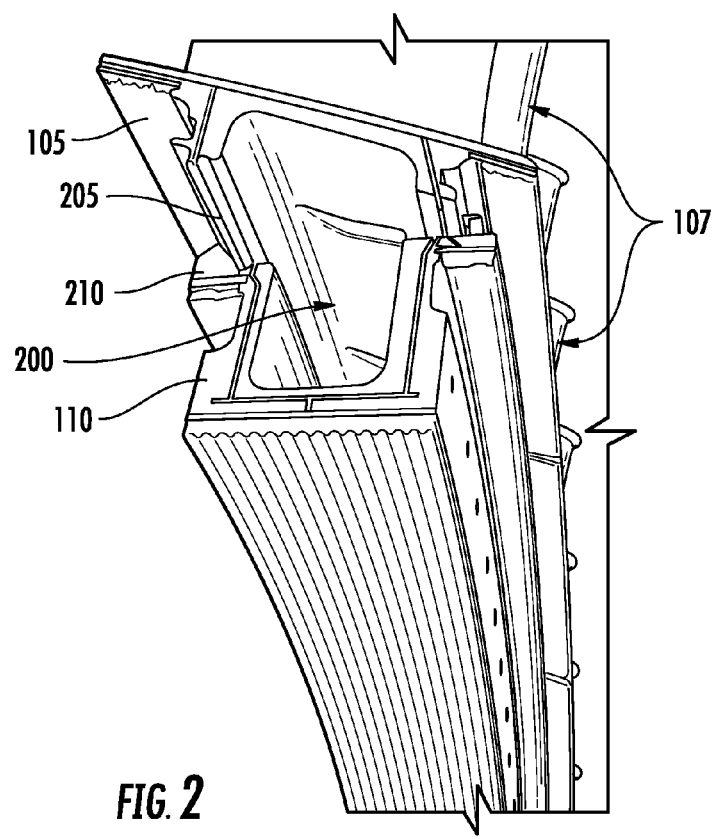
FIG. 2 is front view of a cross-section of the assembled turbine engine vane assembly illustrated in FIG. 1.

FIGS. 1 and 2 illustrate an exemplary turbine engine vane assembly 100 comprising a vane assembly 107, 105 secured to a cavity seal 110 by a securement mechanism 115. FIG. 1 is a side view, and FIG. 2 is a view of a cross-section of the exemplary turbine engine vane assembly illustrating the details of the coupling between the vane assembly 107, 105 and the cavity seal 110. As illustrated in FIGS. 1 and 2, the vane assembly comprises at least one vane 107 assembled and supported on a shroud ring 105. While the illustrated implementation in FIG. 1 illustrates a vane assembly comprising one vane 107, one of ordinary skill in the art will appreciate that more than one vane 107 can be implemented. For example in FIG. 2, a plurality of vanes 107, namely seven vanes 107 are supported and assembled on the shroud ring 105; however, fewer or more vanes 107 can be implemented than as illustrated.

FIG. 2 illustrates the underside of the shroud ring 105. As shown in FIG. 2, a protrusion 205 is formed on the outer surface of the shroud ring 105. The cavity seal 110 illustrated in FIG. 2 is a U-ring type cavity seal but can be any other shape or structure that can form a cavity between the cavity seal 110 and the vane assembly 105, 107 when assembled. In at least one implementation, the cavity seal 110 can comprise a protrusion receiving portion 210 corresponding to the protrusion 205 formed on the shroud ring 105. As illustrated in FIG. 2, the protrusion 205 and the protrusion receiving portion 210 are matingly engaged to interlock the vane assembly 107, 105 to the cavity seal 110. When the vane assembly 107, 105 and the cavity seal 110 are assembled, a cavity 200 is formed therebetween allowing exhaust and coolant to flow therethrough during operation of the turbine engine.

Figure 3:
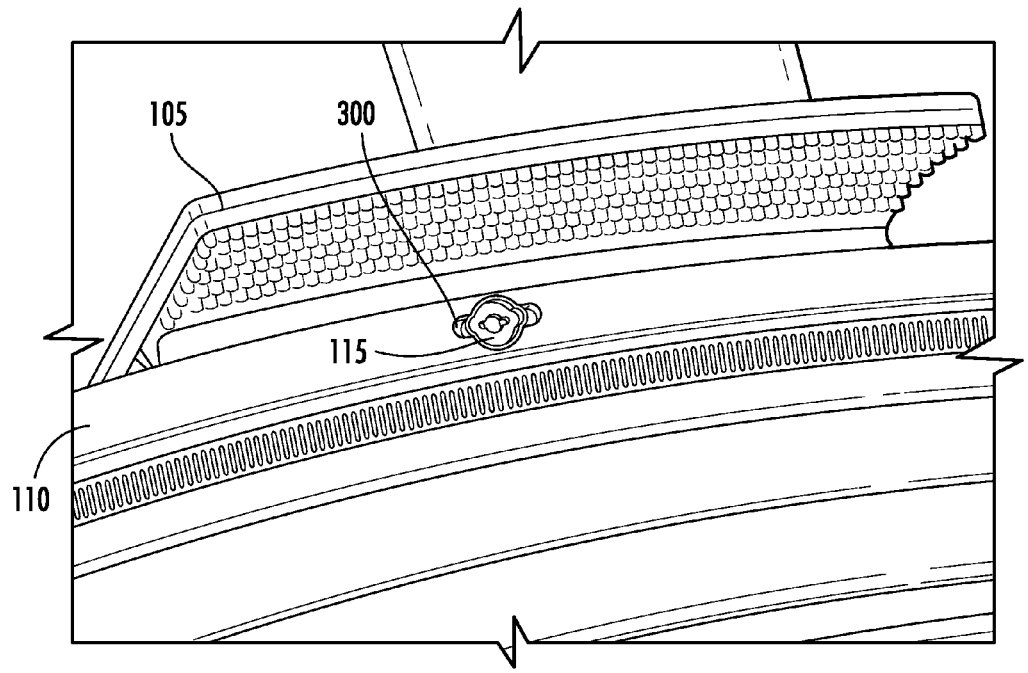
FIG. 3 is close-up view of the assembled turbine engine vane assembly illustrated in FIG. 1, illustrating the securement mechanism securing the vane to the cavity seal of the turbine engine vane assembly.

The cavity seal 110 and the shroud ring 105 are coupled to each other by a securement mechanism 115 as shown in the close-up view of the assembled turbine engine vane assembly illustrated in FIG. 3. As illustrated in FIG. 3, the securement mechanism 115 can be a pin received through the securement receiving portion of the cavity seal 110. In the implementation illustrated in FIG. 3, a deformation receiver 300 is formed on two sides of the securement receiving portion. In FIG. 3, the deformation receivers 300 form a pair of ears on either side of the securement receiving portion. The deformation receivers 300 are configured to receive portions of the deformable rim of the securement mechanism, as will be described in more detail in relation to FIGS. 6 and 9.

Figure 4:
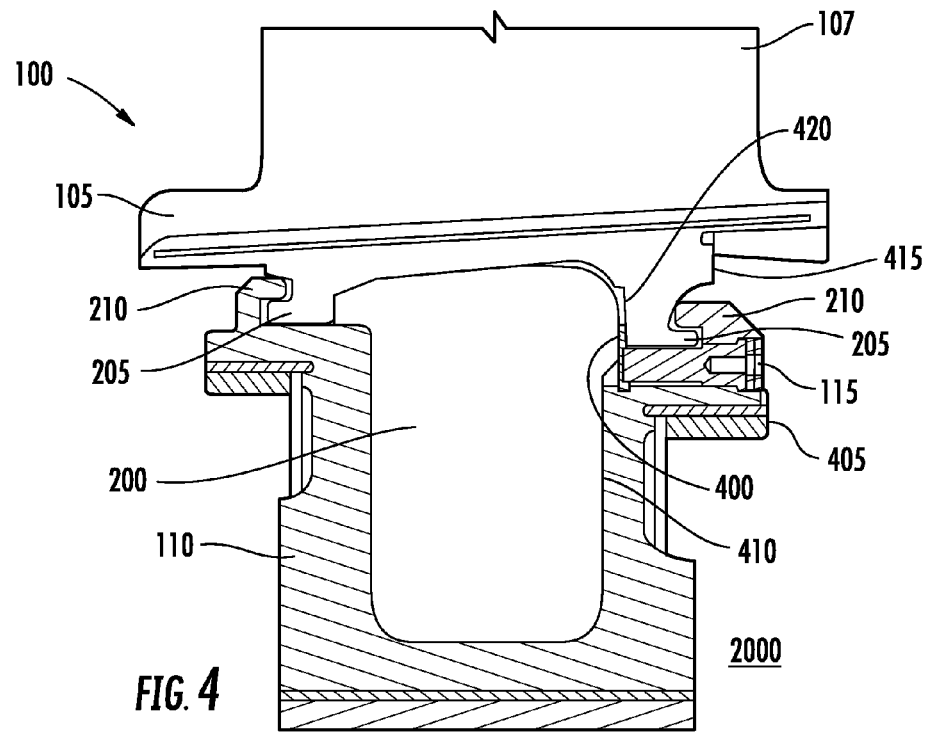
FIG. 4 is a cross-sectional view of an assembled turbine engine vane assembly.

Further details of the coupling of the shroud ring 105 and the cavity seal 110 by the securement mechanism are illustrated in FIG. 4. FIG. 4 is a cross-section of an exemplary implementation of a turbine engine vane assembly 100 in accordance with the present disclosure. As illustrated in FIG. 4, the vane 107 is assembled and supported on the shroud ring 105, and the shroud ring 105 is interlocked with the cavity seal 110 and secured by the securement mechanism 115. The shroud ring 105 includes an outer surface 415 and an inner surface 420. The shroud ring 105 can define an aperture extending from the outer surface 415 to the inner surface 420 to receive the securement mechanism 115. In FIG. 4, the shroud ring 105 defines a semi-circular aperture; however, one of ordinary skill in the art will appreciate that the aperture can be a circular aperture, an ovular aperture, or any other shaped aperture that can receive and accommodate the shape and size of the securement mechanism 115. In at least one implementation, the shroud ring 105 can be pre-fabricated with the aperture for receiving the securement mechanism 115, while in other implementations, the aperture can be machined into an already-existing is shroud ring 105. As illustrated in FIG. 4, the outer surface 415 of the shroud ring 105 can form a protrusion 205 to interlock the shroud ring 105 to the cavity seal 110. In FIG. 4, the protrusion 205 is a foot, but other protrusions 205 can be implemented such as a hook, a tongue, or any other protrusion that can interlock with a protrusion receiving portion 210 of a cavity seal 110.

As illustrated in FIG. 4, the cavity seal 110 is a U-ring type seal, but the cavity seal 110 can be any other shape which can form a cavity 200 when assembled with the vane assembly 107, 105. The cavity seal 110 includes a cavity outer surface 405 and a cavity inner surface 410. The cavity seal 110 can define a securement receiving portion extending from the cavity outer surface 405 to the cavity inner surface 410. The securement receiving portion 500 (illustrated in FIG. 5) can be a through hole or any other opening through which the securement mechanism 115 can be inserted. A protrusion receiving portion 210 can be formed on the cavity outer surface 405 and can be adapted for interlocking engagement with the protrusion 205 of the shroud ring 105. In FIG. 4, the protrusion receiving portion 210 is a shoe but can be any other structure that can interlock with the protrusion 205. For example, the protrusion 205 and protrusion receiving portion 210 can be a tongue and lip interlocking structure, a hook and eye interlocking structure, a lug structure, or any other interlocking structure that allows for the interlocking engagement between the shroud ring 105 and the cavity seal 110.

Also illustrated in FIG. 4, the securement mechanism 115 is a pin having a key 410 at one end of the securement mechanism 115. The securement mechanism 115 can have a first configuration and a second configuration. In at least one implementation, the first configuration can be an unlocked or open configuration, and the second configuration can be a locked or closed configuration to engage the inner surface 420 of the shroud ring 105 and the cavity seal 110. In FIG. 4, the securement mechanism 115 is in a second configuration 2000 that is a locked configuration to lock the shroud ring 105 and the cavity seal 110 in place. In the second configuration 2000, the key 400 has been rotated to engage the inner surface 420 of the shroud ring 105 and the cavity inner surface 410 of the cavity seal 110. As the key 400 engages the inner surface 420 and the cavity inner surface 410, the protrusion 205 of the shroud ring 105 is held in an interlocked engagement with the protrusion receiving portion 210 of the cavity seal 110. Thus, in the second configuration 2000, the key 400 prevents the protrusion 205 from disengaging from the protrusion receiving portion 210, thereby locking the shroud ring 105 and vane 107 in place against the cavity seal 110 during operation of the turbine engine. For example, axial movement of the vane assembly 107, 105 is restrained by the key 400 of the securement mechanism 115. The anti-rotation of the securement mechanism 115 will be described in further detail in relation to FIGS. 6 and 9. In an exemplary implementation, the securement mechanism 115 can be rotated into a second configuration, where the securement mechanism 115 has been rotated ninety degrees about its rotational central axis from the first configuration. In other implementations, the securement mechanism 115 can be rotated two-hundred seventy degrees, eighty-five degrees, sixty degrees, or any degree of rotation that allows the key 400 to become engaged with the inner surface of the shroud ring 105 and the cavity inner surface of the cavity seal 110.

Figure 5:
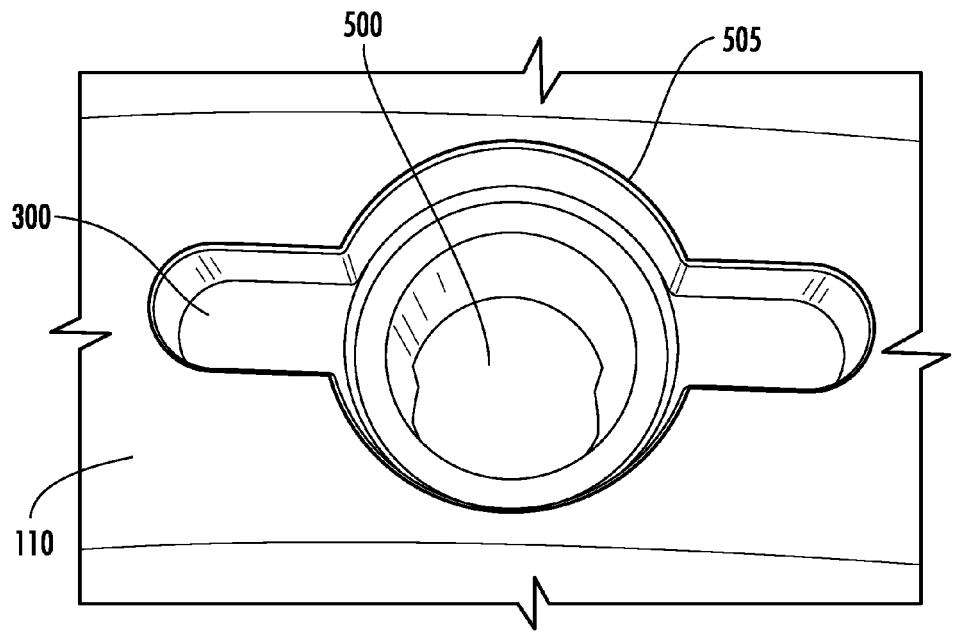
FIG. 5 is a view of the receiving portion of the cavity seal of a turbine engine vane assembly in accordance with an exemplary embodiment of the present technology.
Figure 6:
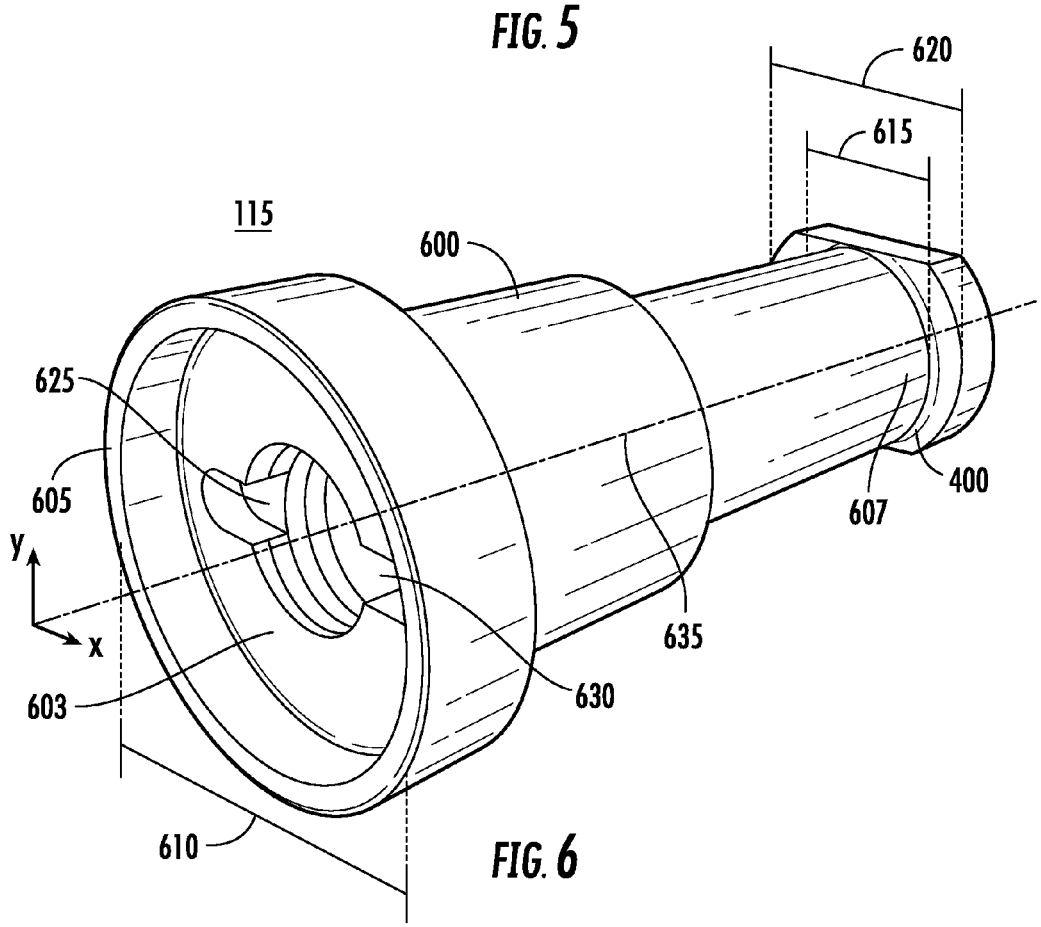
FIG. 6 is a perspective view of a securement mechanism of a turbine engine vane assembly in accordance with an exemplary embodiment of the present technology.

FIG. 5 is an illustration of an exemplary implementation of a securement receiving portion 500 of the cavity seal 110 that is adapted to receive a securement mechanism 115 such as that illustrated in FIG. 6. In FIG. 5, the cavity seal 110 defines a cavity receiving portion 500 extending from the cavity outer surface to the cavity inner surface of the cavity seal 110. In FIG. 5, the securement receiving portion 500 is an opening which can receive a distal end or a second end 607 of a securement mechanism 115 such as the one illustrated in FIG. 6. The securement receiving portion 500 is sized to match the shape and diameter of the securement mechanism 115 and in particular, the size and shape of the key 400 of the securement mechanism 115. In some implementations, a deformation receiver 300 can be formed in the securement receiving portion 500. For example, in FIG. 5, the deformation receiver 300 can extend diametrically across the securement receiving portion 500 and beyond the circumference 505 of the securement receiving portion 500. In FIG. 5, the deformation receiver 300 comprises two slots, one extending diametrically away from a first side and a second extending diametrically away from a second side of the securement receiving portion 500 such that the slots lie along a common axis that is parallel to the diameter of the securement receiving portion 500. The deformation receivers 300 are configured to receive a portion of securement mechanism 115 to prevent rotation of the securement mechanism 115 during operation of the turbine engine. In at least one implementation, the cavity seal 110 can be pre-fabricated with the securement receiving portion 500 and the deformation receiver 300, while in other implementations, the receiving portion 500 and/or the deformation receiver 300 can be machined into an already-existing cavity seal 110.

FIG. 6 is a perspective view of an exemplary securement mechanism 115 that can be inserted in the cavity receiving portion 500 illustrated in FIG. 5. In FIG. 6, the securement mechanism 115 is an anti-rotation pin having a shaft 600 having a first end 603 and a second end 607. In regards to the size and shape of the securement mechanism 115, the first end 603 can have a first diameter 610, and the second end 607 can have a second diameter 615. In FIG. 6, the first diameter 610 is larger than the second diameter 615. Also illustrated in FIG. 6, the first end 603 is on a first segment of the shaft 600, and the second end 607 is on a second segment of the shaft 600. The diameter of the segments of the shaft illustrated in FIG. 6 decreases from the first diameter to the second diameter. In at least one alternative embodiment, the shaft 600 can be a tapered single shaft, where the diameter of the shaft 600 tapers from the first end to the second end from the first diameter 610 to the second diameter 615. The decreasing diameter of the shaft 600 provides for the insertion of the securement mechanism 115 into the aperture of the shroud ring 105 and the receiving portion 500 of the cavity seal 110. As the securement receiving portion 500 is shaped to receive and accommodate the second end 607 of the securement mechanism 115, the securement receiving portion 500 has a diameter corresponding to the second diameter 615 of the securement mechanism 115, which is smaller than the first diameter 610 of the securement mechanism 115. As the securement receiving portion 500 has a diameter smaller than the first end 603 of the securement mechanism 115, the first end 603 of the securement mechanism 115 will not fit through the securement receiving portion 500, and the securement mechanism 115 can be held in place between the cavity seal 110 and the shroud ring 105. Additionally, the securement receiving portion 500 is sized to accommodate the second diameter 615 of the second end 607 of the securement mechanism 115, but is also sized to accommodate the diameter 620 of the key 400 coupled to the second end 607 of the securement mechanism 115.

The securement mechanism 115 can be rotatable about a central axis 635 of the shaft 600. The key 400 can be coupled to the second end 607 of the securement mechanism 115. The key 400 can be a flat plate having two rounded sides that protrude outwardly from the second end 607 in a perpendicular direction to the central axis of the shaft 600. Also, the key 400 can have a diameter 620 or width larger than the diameter 615 of the second end 607 but smaller than the diameter 610 of the first end 603. For example, in FIG. 6, the key 400 is a flat plate forming two projections that protrude perpendicularly to the central axis 635. In another implementation, the key 400 can include a first lobe and a second lobe protruding along a linear axis that is perpendicular to the central axis 635, such that the first lobe and the second lobe protrude away in opposite directions to one another. In either implementation, the projections or lobes of the key 400 can be the surfaces that are adapted for engagement with the inner surface of the shroud ring 105 and the cavity inner surface of the cavity seal 105 when the securement mechanism 115 is assembled in the turbine engine vane assembly in the second configuration or the locked configuration. Additionally, in either implementation, the key 400 can have rounded edges as illustrated in FIG. 6, straight edges, beveled edges, chamfered edges or any other shaped edge. In FIG. 6, the key 400 has rounded edges to facilitate insertion of the securement mechanism 115 through aperture of the shroud ring 105 and the securement receiving portion 500 of the cavity seal 115. The rounded edges of the key 400 can prevent binding between the key 400 and the aperture and securement receiving portion 500 when the securement mechanism 115 is assembled with the shroud ring 105 and the cavity seal 110.

As the key 400 is coupled to the shaft 600 of the securement mechanism, the key 400 is rotatable between a first position corresponding to a first configuration 1000 (shown in FIG. 7) of the securement mechanism 115 and a second position corresponding to a second configuration 2000 (illustrated in FIGS. 4 and 8) of the securement mechanism 115. When the securement mechanism 115 has been assembled with the vane assembly 107, 105 and the cavity seal 110 and has been rotated into the second configuration 2000, the key 400 is also rotated and can engage the shroud ring 105 such that an outer surface of the key 400 abuts the inner surface 420 of the shroud ring 105. A more detailed description of the engagement between the key 400 and the shroud ring 105 and the cavity seal 110 will be described later in relation to FIGS. 7 and 8.

As shown in FIG. 6, in one implementation, the first end 603 of the securement mechanism 115 can have a through hole 630. In FIG. 6, the through hole 630 can be adapted to receive a screwdriver, a torque wrench, and alien wrench or other tool that assists in the rotation of the securement mechanism 115 to lock the vane assembly 107, 105 to the cavity seal 110. In at least one implementation, the through hole 630 can be threaded or shaped to correspond to the tool which assists in the rotation of the securement mechanism. For example, the through hole 630 can be threaded or shaped to accommodate an alien wrench, a hex head tool, or any other similar tool.

Also illustrated in FIG. 6, the first end 603 or pin head of the securement mechanism 115 can define a slot 625 extending across the through hole 630. The slot 625 can have a first position corresponding to the first configuration 1000 of the securement mechanism 115 and a second position corresponding to the second configuration 2000 of the securement mechanism 115. For example, when the securement mechanism 115 is assembled in the first configuration 1000, the slot 625 can be oriented in a first position where the slot 625 is parallel to a diameter 610 of the first end 603 along an x-axis, as illustrated in FIG. 6. When the securement mechanism has been rotated in the second configuration 2000, the slot 625 is rotated into a second position, where the slot is perpendicular to the diameter 610 to the first end along the x-axis. In such an example, the slot 625 is oriented in the same direction as the orientation of the key 400. Thus, when the position of the slot 625 is indicative of the configuration of the securement mechanism 115 and the orientation of the key 400 with respect the key's 400 engagement with the shroud ring 105 and cavity seal 110. In FIG. 6, when the securement mechanism 115 is in the first configuration, the slot 625 is oriented horizontally with respect to the x-axis of the securement mechanism 115, indicating that the key 400 is also oriented horizontally with respect to the x-axis and is disengaged from the shroud ring 105 and cavity seal in an unlocked configuration. Contrastingly, when the securement mechanism 115 is in the second configuration, the slot 625 is oriented perpendicular to the x-axis of the securement mechanism 115, indicating that the key 400 is also oriented perpendicular to the x-axis and is engaged with the shroud ring 105 and the cavity seal 110 in a locked configuration.

While orienting the slot 625 in the same direction as the orientation of the key 400 can provide useful information to the turbine engine operator, the slot 625 can be oriented such that in the first position, the slot 625 is oriented perpendicularly to the x-axis of the securement mechanism 115 while the key 400 is oriented horizontally to the x-axis. In such an implementation, when the securement mechanism 115 is in the second configuration, the slot 625 can be oriented horizontally with respect to the x-axis of the securement mechanism 115, while the key 400 is oriented perpendicular to the x-axis. In either implementation, the slot 625 can provide the operator of the turbine engine with an indication as to whether or not the key 400 is engaged with the shroud ring 105 and the cavity seal 115, and thus whether or not the vane assembly 107, 105 is locked in place with the cavity seal 115. Additionally, the illustrated implementation of FIG. 6 shows a through hole 630 and a slot 625, one of ordinary skill in the art will appreciate that both are not necessary, and the securement mechanism 115 can have one or the other, or neither.

In at least one implementation, the securement mechanism 115 can include a deformable rim 605 at the first end 603. The deformable rim 605 can extend in a direction away from the second end 607 such that the rim has a height 605 extending above the circumference of the first end 603, as illustrated in FIG. 6. The deformable rim 605 can be made of a material different from the material of the shaft 600. For example, the material of the deformable rim 605 can have stiffness that is less than that of the material of the shaft 600, thereby allowing the deformable rim 605 to deform when a pressure or a torque is applied at the first end 603 of the securement mechanism 115 and thereby preventing rotation of the securement mechanism 115 when assembled in a cavity seal 110 having a deformation receiver 300. In other implementations, the deformable rim 605 can be made of the same material as the shaft 600 of the securement mechanism 115.

Figure 7:
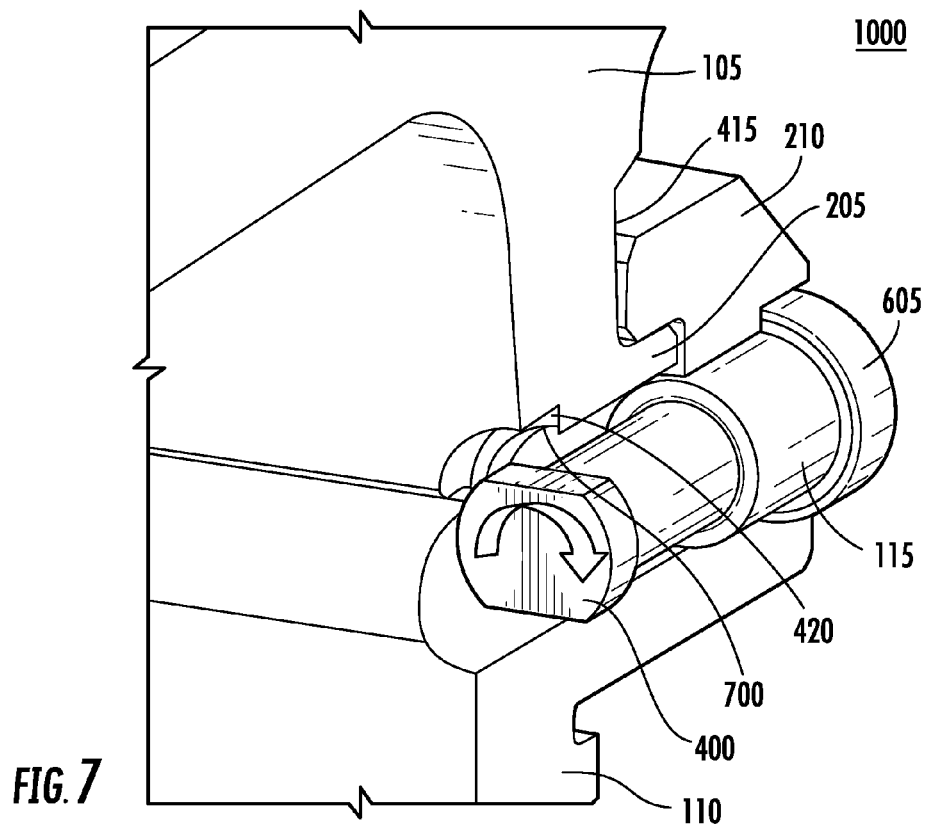
FIG. 7 is a cut-away view of an assembled vane and cavity seal in an unlocked configuration illustrating the cooperation of the securement mechanism with the vane and the cavity seal.

FIG. 7 is a cut-away view of an assembled turbine engine vane assembly assembled in a first configuration 1000. As shown in FIG. 7, the protrusion 205 of the shroud ring 105 of the vane assembly is interlocked with the protrusion receiving portion 210 of the cavity seal 110. The securement mechanism 115 is inserted through the aperture of the shroud ring 105 and the securement receiving portion of the cavity seal 115 but is in the first configuration 1000. Although the protrusion 205 is interlocked in the protrusion receiving portion 210, the protrusion 205 is not secured or locked against the protrusion receiving portion 210, as the securement mechanism 115 is in the first configuration, and the key 400 is not engaged with the inner surface 420 of the shroud ring 105. Thus, FIG. 7 illustrates that the shroud ring 105 and the cavity seal 110 are unlocked and can be separated from each other, and the securement mechanism 115 can be removed from the aperture and the securement receiving portion. Also, as is more clearly shown in FIG. 7, a catch or a ledge 700 is formed in the inner surface 420 of the shroud ring 105. More specifically, the ledge 700 is formed on the inner surface opposite the outer surface 415 that forms the protrusion 205. The ledge 700 provides the inner surface 420 to which the key 400 of the securement mechanism 115 will abut in the locked or second configuration 2000. The arrow that is superimposed on the underside of the key 400 illustrates the rotational direction of the securement mechanism 115 to place the securement mechanism 115 in a locked or second configuration. In FIG. 7, the arrow indicates that the securement mechanism 115 is rotated clockwise to engage the upper surface of the key with the inner surface 420 of the shroud ring 105.

Figure 8:
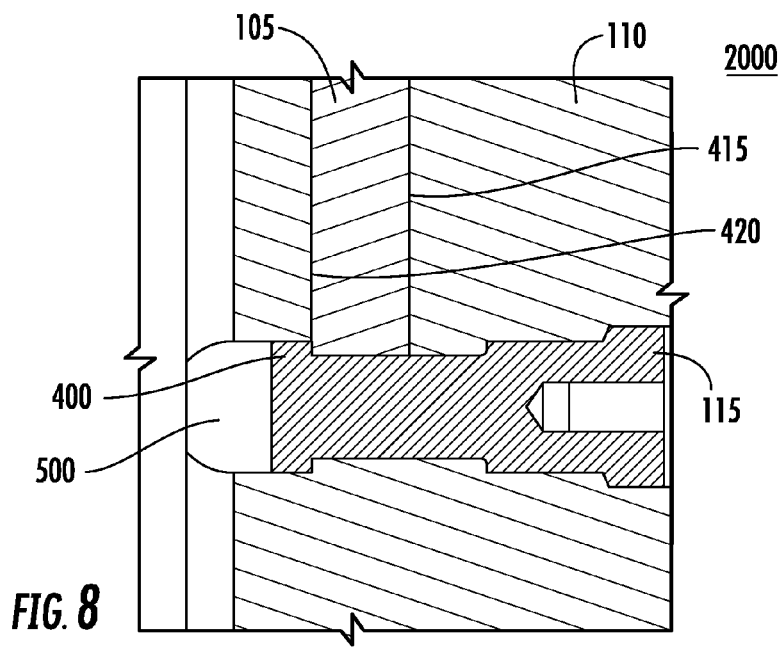
FIG. 8 is cross-sectional view of the assembled vane and cavity seal illustrated in FIG. 7.

If the securement mechanism 115 illustrated in FIG. 7 is rotated approximately ninety degrees about the central axis of the securement mechanism 115, the upper surface of the projections of the key 400 will engage the inner surface 420 of the shroud ring 105 to lock the protrusion 205 of the shroud ring 105 in place with the protrusion receiving portion 210 of the cavity seal 110, as illustrated in the cross-sectional view of an assembled turbine engine vane assembly illustrated in FIG. 8. In FIG. 8, the securement mechanism 115 has been inserted into the aperture and the securement receiving portion 500 of the cavity seal 110 and has been rotated approximately ninety degrees from the first configuration 1000 illustrated in FIG. 7 into the second configuration 2000. As the securement mechanism 115 has been rotated, the key 400 at the second end 607 of the securement mechanism 115 has also been rotated to engage the shroud ring 105 to lock the protrusion 205 of the shroud ring 105 in the protrusion receiving portion 210 of the cavity seal 210. As the projections of the key 400 have been rotated, the upper surface of the projections of the key 400 abut the inner surface 420 of the shroud ring 105 and the cavity inner surface of the cavity seal 110. As shown in FIG. 8, with the key 400 positioned in the second configuration 2000, the key 400 abuts the inner surface 420 of the protrusion 205 of the shroud ring 105, thereby holding the protrusion 205 in the interlocked engagement with the protrusion receiving portion 210 of the cavity seal 110. In the second configuration 2000 illustrated in FIG. 8, the protrusion 205, and thus the shroud ring 105, is prevented from axial movement that might disengage the protrusion 205 from the protrusion receiving portion 210 of the cavity seal 110 due to thermal and vibrational activity occurring during the operation of the turbine engine. In other words, the key 400 can serve as a stop to prevent axial movement and disengagement of the shroud ring 105 from the cavity seal 110.

Figure 9:
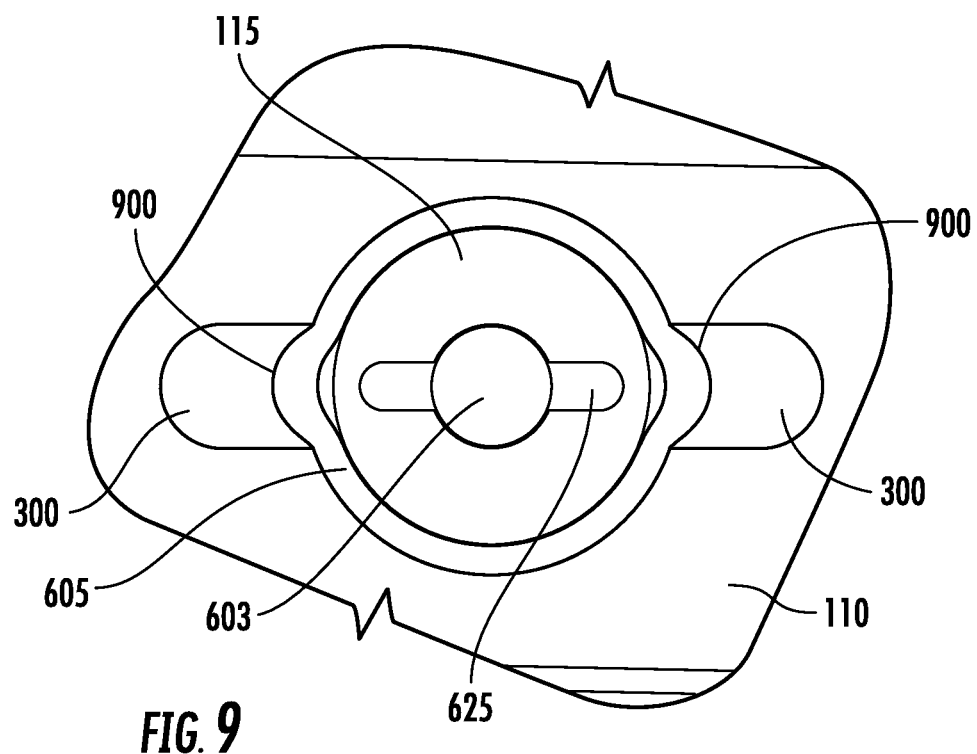
FIG. 9 is a front view of a securement mechanism assembles in the cavity seal of a turbine engine vane assembly in the unlocked configuration of an exemplary embodiment of the present technology.

Additional safeguards can be implemented in the anti-rotation pin retention method described herein to prevent the disengagement of the shroud ring 105 from the cavity seal 110 and the disengagement of the securement mechanism 115 (for example, the anti-rotation pin) from the shroud ring 105 and the cavity seal 110. Such a safeguard is illustrated in FIG. 9. As shown in FIG. 9, the securement mechanism 115 has been inserted into the aperture of the shroud ring 105 (not shown) and the securement receiving portion of the cavity seal 110. Additionally, FIG. 9 illustrates an alternative implementation than as illustrated in FIGS. 6-8, in that the slot 625 of the securement mechanism is indicative of the securement mechanism 115 being in the second configuration or a locked configuration in which the key 400 (not shown) is engaged to lock the shroud ring 105 against the cavity seal 110.

In FIG. 9, the additional safeguard to prevent the disengagement of the shroud ring 105 from the cavity seal is the deformable rim 605 of the securement mechanism 115 and the deformation receiver 300 of the securement receiving portion of the cavity seal 110. In FIG. 9, a force (for example, a pressure or a torque) has been applied to the first end of the securement mechanism 115. The force can deform the deformable rim 605 such that a portion 900 of the deformable rim 605 is received or deformed into the deformation receiver 300 of the cavity seal 110. In an alternative embodiment, the securement mechanism 115 can be stacked at the first end 603 of the securement mechanism 115 to deform the deformable rim 605 such that a portion 900 of the deformable rim 605 is received in the deformation receiver 300. The deformed portion 900 of the deformable rim 605 prevents rotation of the securement mechanism, thereby ensuring that the key 400 is not rotated out of the second configuration 2000 or the locked configuration so that the protrusion 205 of the shroud ring 105 does not disengage the protrusion receiving portion 210 of the cavity seal 110. Additionally, the deformed portion 900 of the deformable ring 605 can lodge the securement mechanism within the deformation receiver 900 and the securement receiving portion of the cavity seal 110 to prevent the securement mechanism 115 from disengaging or popping out of cavity seal 110 and the shroud ring 105.

A method of assembling a turbine engine vane assembly with a securement mechanism 115, a vane assembly comprising a vane 107 supported on a shroud ring 105, and a cavity seal 110 described herein can include aligning the cavity seal 110 with the vane assembly 107, 105 such that the securement receiving portion 500 is aligned with the aperture of the shroud ring 105. The method can also include inserting the securement mechanism 115 (for example, an anti-rotation pin) through the receiving portion of the cavity seal 110 and the aperture of the shroud ring 105. The securement mechanism 115 is then rotated such that a projection (for example, a key 400) of the securement mechanism 115 abuts an inner surface of the shroud ring 105 and an inner surface of the cavity seal 110. For example, the securement mechanism 115 can be rotated approximately ninety degrees. As the projection of the securement mechanism 115 abuts the shroud ring 105 and the cavity seal 110, the alignment of the vane assembly 107, 105 with the cavity seal 110 is secured and maintained during operation of the turbine engine. Additionally, the securement mechanism 115 is secured from disengagement from the cavity seal 110 and the vane assembly 107, 105. The method can also include deforming the securement mechanism 115 at a first end such that a portion of the first end of the securement mechanism is received in a deformation receiver 300 or a deformation slot of the cavity seal 110, thereby ensuring that the securement mechanism 115 does not become dislodged from the aperture and the securement receiving portion 500 during operation of the turbine engine.

Accordingly, the present technology is directed to a turbine engine vane assembly assembled with an anti-rotation pin method. With the assembly described herein, the assembly of the securement mechanism (for example, the anti-rotation pin) in the securement receiving portion of the cavity seal maintains the interlocking engagement of the vane assembly with the cavity seal by reducing axial movement of the protrusion of the vane assembly and ensuring that the securement mechanism does not disengage or come out of the cavity seal and the shroud ring. While the present disclosure is directed to an anti-rotation pin method for a stationary vane assembly for a turbine engine, one of ordinary skill in the is art will appreciate that the anti-rotation pin method can be implemented in other stationary components of a turbine engine, in interlocking components of an engine, or any other system where the prevention of axial movement and disengagement of interlocked components is desired.

Exemplary implementations have been described hereinabove regarding an anti-rotation pin method for a turbine engine vane assembly. One of ordinary skill in the art will appreciate that the features in each of the figures described herein can be combined with one another and arranged to achieve the described benefits of the presently disclosed anti-rotation pin method for a turbine engine vane assembly. Additionally, one of ordinary skill will appreciate that the elements and features from the illustrated implementations herein can be optionally included to achieve the described benefits of the presently disclosed anti-rotation pin method for a turbine engine vane assembly. Various modifications to and departures from the disclosed implementations will occur to those having skill in the art.

The foregoing description is provided in the context of one possible configuration for the system according to aspects of the invention. While the above description is made in the context of a downstream end region of a combustor liner assembly, it will be understood that the system according to aspects of the invention may be applied to other portions of the combustor liner as well as other turbine engine components, such as the transition duct. Thus, it will of course be understood that the invention is not limited to the specific details described herein, which are given by way of example only, and that various modifications and alterations are possible within the scope of the invention as defined in the following claims.

What is claimed is:

1. A turbine engine vane assembly comprising:
a vane;
a shroud ring supporting the vane and comprising an outer surface, an inner surface, and a protrusion formed on the outer surface, said shroud ring defining an aperture extending from the outer surface to the inner surface;
a cavity seal comprising a cavity outer surface, a cavity inner surface, and a protrusion receiving portion corresponding to the protrusion of the shroud ring; and
a securement mechanism comprising a shaft having a first end and a second end, said shaft having a first diameter at the first end and a second diameter at the second end, said first diameter being larger than the second diameter, wherein said shaft has a diameter between the first end and the second end that is greater than the second diameter and less than the first diameter, and comprising a key at the second end of the shaft, said securement mechanism adapted for insertion through the aperture, wherein upon insertion, said key protrudes from the aperture at the cavity inner surface and the inner surface of the shroud ring,
said securement mechanism being rotatable between a first configuration and a second configuration, wherein in the second configuration, said key matingly engages the shroud ring such that an outer surface of the key abuts the inner surface of the shroud ring.

2. The assembly of claim 1, wherein the first configuration is oriented approximately 90 degrees about a central axis from the second configuration.

3. The assembly of claim 1, wherein said cavity seal defines a securement receiving portion extending from the cavity outer surface to the cavity inner surface, said securement receiving portion comprising a deformation receiver positioned on a periphery of the securement receiving portion and extending peripherally away from a periphery of the securement receiving portion, wherein said securement mechanism further comprises a deformable rim at the first end of the shaft, and wherein when a pressure is exerted against the securement mechanism at the first end a portion of the deformable rim is received in the deformation receiver of the cavity seal.

4. The assembly of claim 3, wherein the first end of the securement mechanism defines a slot extending along the first diameter at the first end, said slot oriented on the first end to correspond to the first configuration and the second configuration of the securement mechanism.

5. The assembly of claim 4, wherein, when the securement mechanism is inserted into the aperture and the securement receiving portion and placed in the second configuration, the slot is oriented such that the slot is perpendicular to the deformation receiver.

6. The assembly of claim 4, wherein, when the securement mechanism is inserted into the aperture and the securement receiving portion and placed in the second configuration, the slot is oriented such that the slot is parallel to the deformation receiver.

7. The assembly of claim 1, wherein said key is a pair of ears positioned parallel to one another and extending diametrically away from the second end of the securement mechanism.

8. The assembly of claim 1, wherein the protrusion and the protrusion receiving portion interlock when the shroud ring and the cavity seal are assembled.

9. The assembly of claim 1, wherein the cavity seal is a U-ring seal.

10. An anti-rotation securement mechanism for securing a vane assembly to a cavity seal of a turbine engine, said anti-rotation securement mechanism comprising:
a shaft having a first end and a second end, said shaft having a first diameter at the first end and a second diameter at the second end, said first diameter being larger than the second diameter, wherein said shaft has a diameter between the first end and the second end that is greater than the second diameter and less than the first diameter;
a pin head at the first end of the shaft, said pin head defining a slot; and
a projection protruding from the second end and protruding perpendicularly to a central axis of the shaft;
wherein the slot is rotatable from a first position parallel to a linear axis of the pin head aligned perpendicular to the central axis to a second position oriented at an angle greater than zero degrees with respect to the linear axis;
wherein the projection is configured to matingly engage with an inner surface of the cavity seal and an inner surface of the vane assembly upon rotation of the slot between the first and second positions, thereby locking the vane assembly against the cavity seal.

11. The securement mechanism of claim 10, wherein the pin head comprises a rim along a circumference of the pin head, wherein said anti-rotation securement mechanism comprises a first configuration and a second configuration, wherein in the first configuration said slot in the first position and wherein in the second configuration the slot and the projection are oriented perpendicular to the linear axis of the pin head in the second position, and wherein in the second configuration the projection matingly engages the inner surface of the cavity seal and the inner surface of the vane assembly.

12. The securement mechanism of claim 11, wherein the rim extends a height above the pin head.

13. The securement mechanism of claim 11, wherein the cavity seal comprises a deformation receiver, and when the anti-rotation securement mechanism is assembled with the vane assembly and the cavity seal, the deformation receiver is perpendicular to the slot in the second configuration and parallel to the slot in the first configuration.

14. The securement mechanism of claim 13, wherein the rim is a deformable material, and when said anti-rotation securement mechanism is assembled with the vane assembly and the cavity seal, a portion of the rim is deformed and received in the deformation receiver of the cavity seal.

15. The securement mechanism of claim 10, wherein the projection comprises a first lobe and a second lobe with rounded edges, said first lobe and second lobe protruding away from the second end in opposite directions to each other, wherein the rounded edges of the first and second lobe are spaced by straight edges along the projection.

16. A cavity seal for attachment with a vane assembly of a turbine engine by an anti-rotation pin, said cavity seal comprising:
an outer surface;
an inner surface spaced a distance from the outer surface, said inner surface defining a cavity for directing coolant during an operation of the gas turbine engine;

a locking portion formed on the outer surface and configured for interlocking engagement with a protrusion of the vane assembly to prevent axial movement of the vane assembly; and a pin receiving portion formed between a portion of the outer surface excluding the locking portion and the inner surface such that the pin receiving portion extends therethrough.

17. The cavity seal of claim 16, further comprising a deformation receiver extending across the pin receiving portion, said deformation receiver adapted to accommodate a portion of the anti-rotation pin when a pressure is applied against the anti-rotation pin and said deformation receiver further configured to receive the portion of the anti-rotation pin to prevent rotation of the anti-rotation pin;

and wherein the outer surface and the inner surface form a U-ring.

* * * * *